United States Patent
Nellen et al.

(10) Patent No.: US 8,991,912 B2
(45) Date of Patent: Mar. 31, 2015

(54) DRIVE MECHANISM AND OPEN ROOF CONSTRUCTION PROVIDED THEREWITH

(71) Applicant: Inalfa Roof Systems Group B.V., Venray (NL)

(72) Inventors: Marcel Johan Christiaan Nellen, Merselo (NL); Ruud Geurts, Helden (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 14/032,558

(22) Filed: Sep. 20, 2013

(65) Prior Publication Data
US 2014/0084638 A1 Mar. 27, 2014

(30) Foreign Application Priority Data
Sep. 25, 2012 (EP) .................................... 12185815

(51) Int. Cl.
*B60J 7/057* (2006.01)
*B60J 7/047* (2006.01)
*B60J 7/02* (2006.01)

(52) U.S. Cl.
CPC ... *B60J 7/057* (2013.01); *B60J 7/02* (2013.01)
USPC .................. 296/223; 296/216.08; 296/216.03

(58) Field of Classification Search
CPC .................................... B60J 7/02; B60J 7/157
USPC ............................................. 296/216.01–224
See application file for complete search history.

(56) References Cited

U.S. PATENT DOCUMENTS

| 4,671,565 A * | 6/1987 | Grimm et al. ............ 296/216.04 |
| 8,459,730 B2 * | 6/2013 | Sawada et al. ................ 296/223 |
| 2006/0012224 A1 | 1/2006 | Boehm et al. |
| 2011/0233971 A1 * | 9/2011 | Nellen et al. .................. 296/222 |
| 2012/0068503 A1 | 3/2012 | Uehara et al. |

FOREIGN PATENT DOCUMENTS

| EP | 1510389 | 3/2005 |
| EP | 1616738 | 7/2007 |
| FR | 2917337 | 12/2008 |

OTHER PUBLICATIONS

European Search Report from corresponding foreign application EP12185815.3 filed Sep. 25, 2012.

* cited by examiner

*Primary Examiner* — Dennis H Pedder
(74) *Attorney, Agent, or Firm* — Steven M. KoehleR; Westman, Champlin & Koehler, P.A.

(57) ABSTRACT

A drive mechanism comprising a guide channel and a cooperating slide shoe the which guide channel comprises a first part extending in a substantially horizontal direction configured to move the shoe on a first level and a second part extending downwardly relative to said substantially horizontal direction configured to move the shoe to a lower second level an elongate drive member is attached to the shoe and extends along the channel, substantially in parallel to the first part of the channel. At least one portion of the shoe moves relative to the remainder of the shoe so as not to interfere with the drive member when the shoe is positioned at the lower second level. The drive member is located within the vertical projection at a level above the level assumed by the lowermost part of the slide shoe when the slide shoe is positioned at the lower second level.

18 Claims, 4 Drawing Sheets

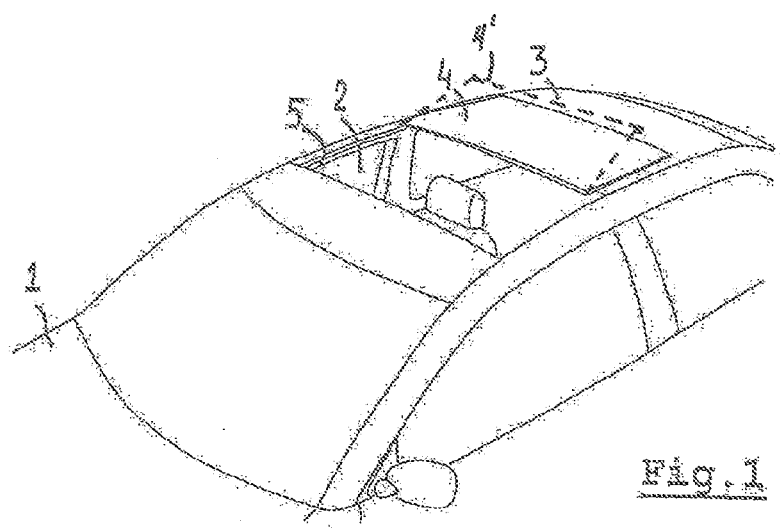

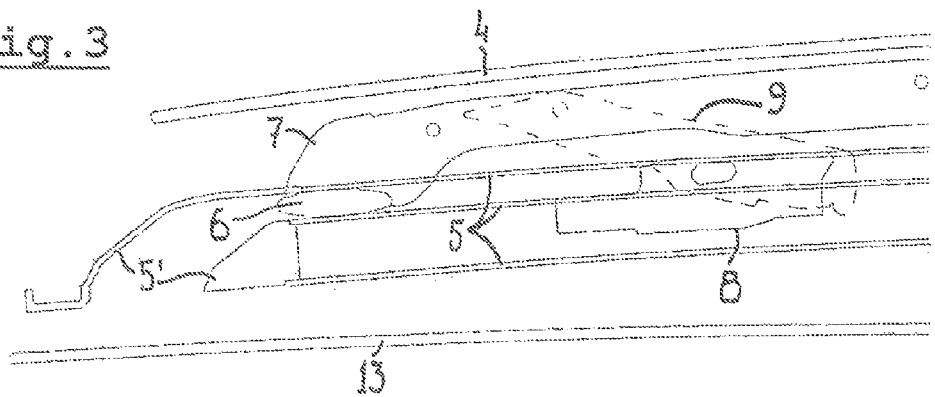
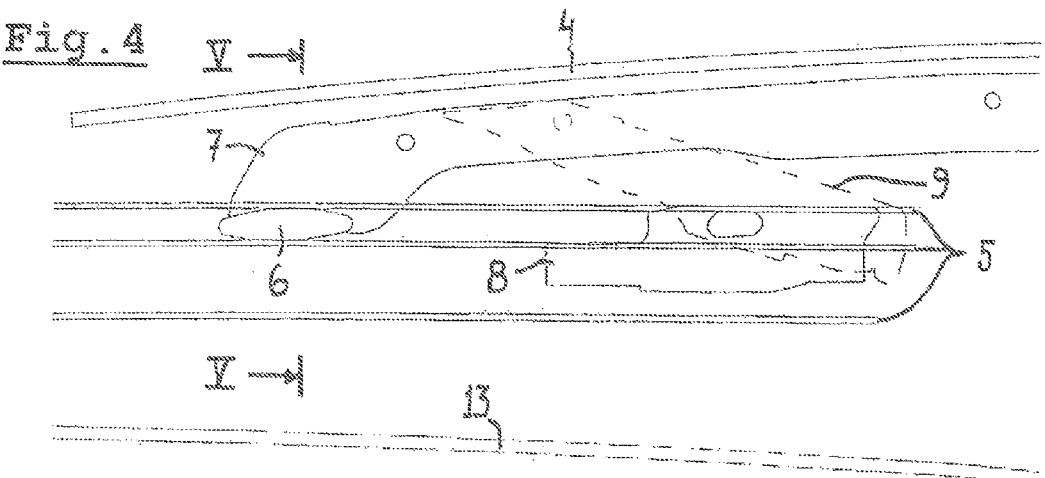

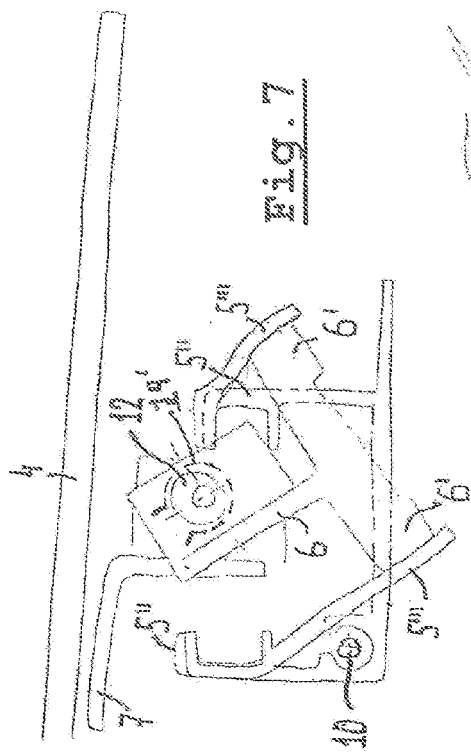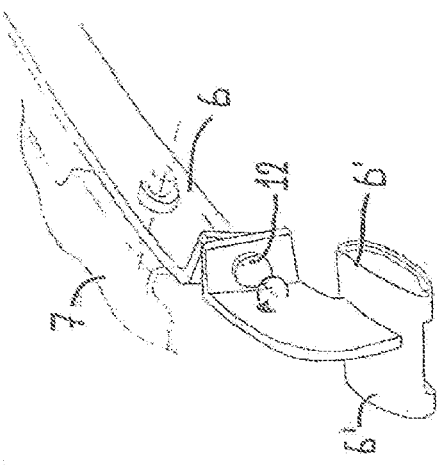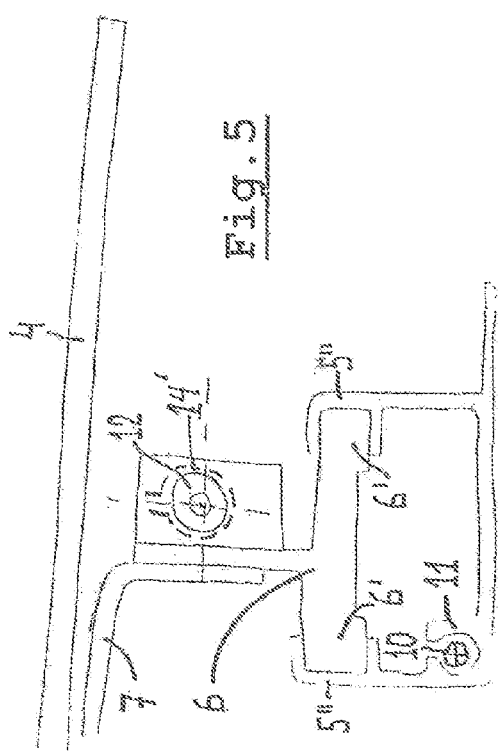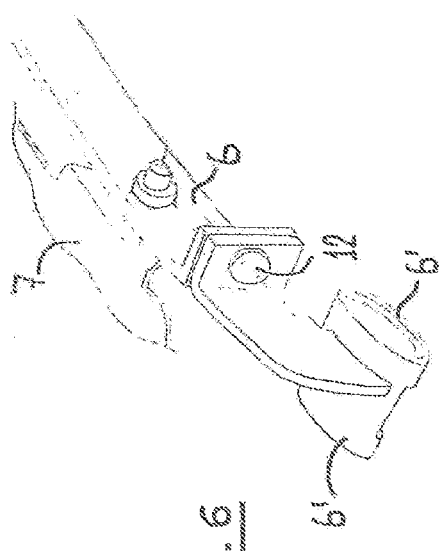

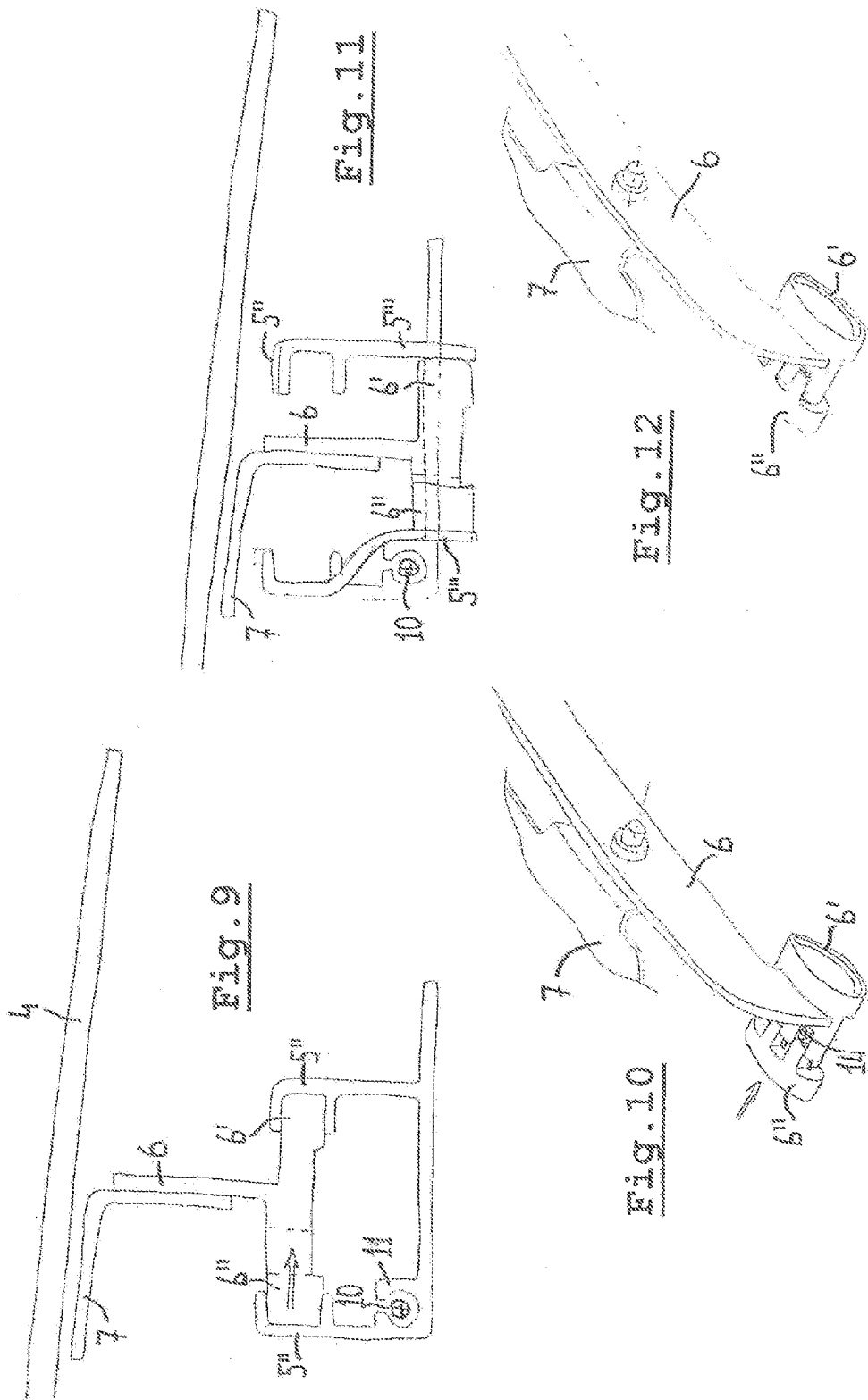

DRIVE MECHANISM AND OPEN ROOF CONSTRUCTION PROVIDED THEREWITH

BACKGROUND

The discussion below is merely provided for general background information and is not intended to be used as an aid in determining the scope of the claimed subject matter.

Aspects of the invention relate to a drive mechanism for an open roof construction of a vehicle, comprising a guide channel and a slide shoe cooperating therewith, which guide channel comprises a first part extending in a substantially horizontal direction for moving the slide shoe on a first level in said substantially horizontal direction, and a second part extending downwardly relative to said substantially horizontal direction for moving the slide shoe to a lower second level, and further comprising an elongate drive member attached to the slide shoe and extending along the guide channel, substantially in parallel to the first part of the guide channel.

For limiting the dimensions of such a drive mechanism (and, consequently, the dimensions of an open roof construction provided therewith) the elongate drive member (which for example may be a push-pull cable) should be positioned as close to the guide channel as possible. However, when positioning the elongate drive member care should be taken that it will not interfere with the slide shoe when latter moves downwardly in the second part of the guide channel from its first level towards the lower second level.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the invention is a drive mechanism that has at least one portion of the slide shoe relative to the remainder of the slide shoe movable to a position not to interfere with the elongate drive member when the slide shoe is positioned at its lower second level, wherein the drive member is located within the vertical projection of the guide channel and at a level above the level assumed by the lowermost part of the slide shoe when the slide shoe is positioned at its lower second level.

Due to the movement of said at least one portion of the slide shoe, the slide shoe will not interfere with the elongate drive member which, therefore, does not have to be positioned aside or below the guide channel. The drive mechanism will have smaller dimensions than a state of the art drive mechanism and in the open roof construction there will be more available space, for example for a wider roof opening.

In one embodiment of the drive mechanism, said at least one portion of the slide shoe is slidable relative to the remainder of the slide shoe between an extended position when the slide shoe is positioned in the first guide channel part and a retracted position when the slide shoe is positioned at its lower second level.

In the extended position the slide shoe functions in a normal manner (generally when the slide shoe is positioned in the first guide channel part). In the retracted position the slide shoe may pass the elongate drive member, however without losing its guiding functionality within the guide channel (especially within the second guide channel part).

In a special embodiment of such a drive mechanism, said at least one portion of the slide shoe is preloaded towards its extended position. Such a preload for example may be caused by a spring member and prevents said at least one portion of the slide shoe from getting disengaged from the corresponding guide channel part.

In another embodiment of such a drive mechanism the guide channel is provided with two opposite guide slots extending along the first and second guide channel parts of the guide channel and cooperating with two opposite slide shoe wings of which a first slide shoe wing defines said at least one portion of the slide shoe, wherein the guide slot cooperating with said first slide shoe wing is shaped such in the second guide channel part that it causes the first slide shoe wing to move from its extended position towards its retracted position when the slide shoe enters said second guide channel part.

In such an embodiment the shape of the guide slot cooperating with said first slide shoe wing and the cooperation between said guide slot and the corresponding slide shoe wing automatically causes said slide shoe wing to move between its extended and retracted positions without the need for other provisions causing such a movement.

In an alternative embodiment of the drive mechanism, said at least one portion of the slide shoe is rotatable relative to the remainder of the slide shoe between a non-rotated position when the slide shoe is positioned in the first guide channel part and a rotated position when the slide shoe is positioned at its lower second level.

In the non-rotated position the slide shoe functions in a normal manner (generally when the slide shoe is positioned in the first guide channel part). In the rotated position the slide shoe may pass the elongate drive member, however without losing its guiding functionality within the guide channel (especially within the second guide channel part).

Also in such an embodiment of the drive mechanism it is possible, that said at least one portion of the slide shoe is preloaded towards its non-rotated position.

In said alternative embodiment of the drive mechanism it further is conceivable, that the guide channel is provided with two opposite guide slots extending along the first and second guide channel parts of the guide channel and cooperating with two opposite slide shoe wings defining said at least one portion of the slide shoe, which in a commonly rotatable manner are connected to the remainder of the slide shoe, wherein the guide slots are shaped such in the second guide channel part that they cause the slide shoe wings to rotate from their non-rotated position towards their rotated position when the slide shoe enters said second guide channel part.

In such an embodiment, basically the entire operative part of the slide shoe (that means the parts thereof cooperating with the guide channel) is capable of a rotation relative to the remainder of the slide shoe. This means that, although the guide slots are shaped such in the second guide channel part that they cause the slide shoe wings to rotate from their non-rotated position towards their rotated position when the slide shoe enters said second guide channel part, the distance between said guide slots may be kept the same all over the guide channel, and that only the spatial orientation of the guide slots at the second guide channel part will differ from the spatial orientation at the first guide channel part.

It is noted, however, that it also may be possible to provide an embodiment in which only one of said slide shoe wings is rotatable. In such a case only one guide slot would need a shape for rotating said slide shoe wing (basically in correspondence with the above-mentioned embodiment in which one slide shoe wing is slidable relative to the remainder of the slide shoe).

In a second aspect the invention relates to an open roof construction for a vehicle, comprising a roof opening in a stationary roof part and a movable panel for closing and at least partially opening said roof opening, which panel is movable by means of at least two drive mechanisms having aspects of the present invention.

In one embodiment of such an open roof construction the movable panel is a spoiler. However, it is also possible that the movable panel is another type movable panel, such as for example a wind deflector or a slidable and/or tiltable roof panel.

BRIEF DESCRIPTION OF THE DRAWINGS

Hereinafter aspects of the invention will be elucidated while referring to the drawing, in which:

FIG. 1 in a perspective view illustrates part of a vehicle with an open roof construction embodying the invention;

FIGS. 2-4 show successive stages during the operation of a drive mechanism;

FIG. 5 shows a section according to V-V in FIG. 4 of an embodiment with a rotatable slide shoe part;

FIG. 6 shows a perspective view of the slide shoe in the embodiment of FIG. 5;

FIG. 7 shows a section according to VI-VI in FIG. 2 of the embodiment with a rotatable slide shoe part;

FIG. 8 shows a perspective view of the slide shoe in the embodiment of FIG. 7;

FIG. 9 shows a section according to V-V in FIG. 4 of an embodiment with a slidable slide shoe part;

FIG. 10 shows a perspective view of the slide shoe in the embodiment of FIG. 9;

FIG. 11 shows a section according to VI-VI in FIG. 2 of the embodiment with a slidable slide shoe part, and FIG. 12 shows a perspective view of the slide shoe in the embodiment of FIG. 11.

DETAILED DESCRIPTION OF THE ILLUSTRATIVE EMBODIMENTS

Firstly referring to FIG. 1, a vehicle 1 is shown partly. The vehicle 1 comprises a roof opening 2 in a stationary roof part 3 and a movable panel 4 for closing and at least partially opening said roof opening.

The movable panel 4 may be a spoiler 4' (as illustrated in dashed lines in FIG. 1), a top slider or any other kind of movable panel which carries out a movement by means of at least two drive mechanisms which are located at opposite longitudinal sides of the roof opening 2. Of these drive mechanisms in FIG. 1 only a guide channel 5 at one longitudinal side of the roof opening 2 is visible.

FIGS. 2-4 more clearly show parts of such a drive mechanism. Within the guide channel 5 a slide shoe 6 is positioned cooperating therewith in a manner known per se for offering a bracket 7 attached thereto (and carrying the movable panel 4 in a manner not shown in detail) a desired succession of movements (in the present embodiment in combination with a driven slide 8 and a lever 9, wherein the cooperation between these parts is known per se and has no bearing on the present invention and thus is not detailed here). As a result the movable panel 4 will carry out a desired movement when the slide shoe 6 moves along the guide channel 5.

The guide channel comprises a first part 5 extending in a substantially horizontal direction for moving the slide shoe 6 on a first level in said substantially horizontal direction, and a second part 5' (in the art also referred to as locator) extending downwardly relative to said substantially horizontal direction for moving the slide shoe 6 to a lower second level. In FIG. 2 the slide shoe 6 is located within said second guide channel part (or locator) 5'. In FIGS. 3 and 4, however, the slide shoe 6 is positioned in the substantially horizontally extending part 5 of the guide channel (wherein FIG. 3 represents a partly opened position of the movable panel 4 and FIG. 4 represents a fully opened position thereof).

As shown more clearly in FIGS. 5, 7, 9 and 11, the drive mechanism further comprises an elongate drive member 10 attached to the slide shoe 6 and extending along the guide channel 5 (or, as clearly illustrated, in a channel 11 being an integral part of the guide channel 5), substantially in parallel to the first part 5 of the guide channel. This elongate drive member, which for example may comprise a push-pull cable, is driven by any kind of driving force (caused, for example, by an electric motor or manually by an operator).

As will appear below, at least one portion of the slide shoe 6 relative to the remainder of the slide shoe is movable to a position not to interfere with the elongate drive member 10 when the slide shoe is positioned at its lower second level, wherein the drive member 10 is located within the vertical projection of the guide channel and at a level above the level assumed by a lowermost part of the slide shoe 6 when the slide shoe is positioned at its lower second level.

FIGS. 5-8 show an embodiment of the drive mechanism, wherein the guide channel is provided with two opposite guide slots 5" and 5'" extending along the first and second guide channel parts 5 and 5', respectively, of the guide channel and cooperating with two opposite slide shoe wings 6' defining said at least one portion of the slide shoe, which in a commonly rotatable manner are connected to the remainder of the slide shoe 6.

The guide slots 5'" of the second guide channel part 5' are shaped such that they cause the slide shoe wings 6' to rotate from their non-rotated position in FIGS. 5 and 6 towards their rotated position in FIGS. 7 and 8 when the slide shoe 6 enters said second guide channel part 5'.

Said slide shoe wings 6' are rotatable relative to the remainder of the slide shoe 6 around an axis of rotation 12 extending substantially in parallel to the first guide channel part 5.

Also in such an embodiment of the drive mechanism it is possible, that said at least one portion of the slide shoe 6 is preloaded towards its non-rotated position (FIG. 5) with a spring member schematically indicated at 14' in FIGS. 5 and 7.

Such an arrangement allows the slide shoe 6 to move from the first level (in the first guide channel part 5) to the second level (in the second guide channel part, or locator, 5') without engaging the elongate drive member 10. As a result the drive member may be located within the vertical projection of the guide channel 5 and at a level above the level assumed by the lowest part of the slide shoe 6 when latter is positioned at its second level in the locator (basically this means that the drive member 10 is located within the cross section of the guide channel 5). Thus the dimensions of the drive mechanism may be minimised, compared to the state of the art in which the drive member 10 is located outside of the cross section of the guide channel 5. For example, a headliner 13 (see FIG. 2) may be located at a higher level.

FIGS. 9-12 show an alternative embodiment of the drive mechanism. The guide channel again is provided with two opposite guide slots 5" and 5'" extending along the first and second guide channel parts 5 and 5', respectively, of the guide channel and cooperating with two opposite slide shoe wings 6' and 6" of which a first slide shoe wing 6" defines a portion of the slide shoe which is slidable relative to the remainder of the slide shoe 6 between an extended position (FIGS. 9 and 10) when the slide shoe 6 is positioned in the first guide channel part 5 and a retracted position (FIGS. 11 and 12) when the slide shoe 6 is positioned at its lower second level (in the second guide channel part 5'). As shown clearly in FIG. 11, the left one of the guide channel parts 5'" is shaped such that it will cause the sliding movement of the slide shoe wing 6".

Again, such an arrangement allows the slide shoe 6 to move from the first level to the second level without engaging the elongate drive member 10.

The at least one portion of the slide shoe 6 which is rotatable or slidable relative to the remainder of the slide shoe may be preloaded towards its non-rotated or extended position (in FIG. 10 a spring member 14 is illustrated causing such a preload).

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A drive mechanism for an open roof construction of a vehicle, comprising a guide channel and a slide shoe cooperating therewith, which guide channel comprises a first guide channel part extending in a substantially horizontal direction configured to move the slide shoe on a first level in said substantially horizontal direction, and a second guide channel part extending downwardly relative to said substantially horizontal direction configured to move the slide shoe to a lower second level, and further comprising an elongate drive member attached to the slide shoe and extending along the guide channel, substantially in parallel to the first part of the guide channel, wherein at least one portion of the slide shoe is movable relative to the remainder of the slide shoe to a position not to interfere with the elongate drive member when the slide shoe is positioned at the lower second level and wherein the at least one portion of the slide shoe moves with the remainder of the slide shoe throughout movement on the first level and movement to the second level and back to the first level, wherein the guide channel defines a vertical projection and wherein the drive member is located within the vertical projection of the guide channel and at a level above the level assumed by the lowermost part of the slide shoe when the slide shoe is positioned at the lower second level.

2. The drive mechanism according to claim 1, wherein said at least one portion of the slide shoe is slidable relative to the remainder of the slide shoe between an extended position when the slide shoe is positioned in the first guide channel part and a retracted position when the slide shoe is positioned at the lower second level.

3. The drive mechanism according to claim 2, wherein said at least one portion of the slide shoe is preloaded towards the extended position.

4. The drive mechanism according to claim 2, wherein the guide channel is provided with two opposite guide slots extending along the first and second guide channel parts of the guide channel and cooperating with two opposite slide shoe wings of which a first slide shoe wing defines said at least one portion of the slide shoe, wherein the guide slot cooperating with said first slide shoe wing is shaped such in the second guide channel part that the second guide channel part causes the first slide shoe wing to move from the extended position towards the retracted position when the slide shoe enters said second guide channel part.

5. The drive mechanism according to claim 1, wherein said at least one portion of the slide shoe is rotatable relative to the remainder of the slide shoe between a non-rotated position when the slide shoe is positioned in the first guide channel part and a rotated position when the slide shoe is positioned at the lower second level.

6. The drive mechanism according to claim 5, wherein said at least one portion of the slide shoe is preloaded towards the non-rotated position.

7. The drive mechanism according to claim 5, wherein the guide channel is provided with two opposite guide slots extending along the first and second guide channel parts of the guide channel and cooperating with two opposite slide shoe wings defining said at least one portion of the slide shoe, which in a commonly rotatable manner are connected to the remainder of the slide shoe, wherein the guide slots are shaped such in the second guide channel part that they cause the slide shoe wings to rotate from their non-rotated position towards their rotated position when the slide shoe enters said second guide channel part.

8. The drive mechanism according to claim 5, wherein said at least one portion of the slide shoe is rotatable relative to the remainder of the slide shoe around an axis of rotation extending substantially in parallel to the first guide channel part.

9. An open roof construction for a vehicle, comprising a roof opening in a stationary roof part, a movable panel configured to close and at least partially opening said roof opening, and two drive mechanisms connected to the movable panel on each of two opposite sides of the movable panel, each drive mechanism comprising a guide channel and a slide shoe cooperating therewith, which guide channel comprises a first guide channel part extending in a substantially horizontal direction configured to move the slide shoe on a first level in said substantially horizontal direction, and a second guide channel part extending downwardly relative to said substantially horizontal direction configured to move the slide shoe to a lower second level, and further comprising an elongate drive member attached to the slide shoe and extending along the guide channel, substantially in parallel to the first part of the guide channel, wherein at least one portion of the slide shoe is movable relative to the remainder of the slide shoe to a position not to interfere with the elongate drive member when the slide shoe is positioned at the lower second level and wherein the at least one portion of the slide shoe moves with the remainder of the slide shoe throughout movement on the first level and movement to the second level and back to the first level, wherein the guide channel defines a vertical projection and wherein the drive member is located within the vertical projection of the guide channel and at a level above the level assumed by the lowermost part of the slide shoe when the slide shoe is positioned at the lower second level.

10. The open roof construction according to claim 9, wherein the movable panel is a spoiler.

11. The open roof construction according to claim 9, wherein each of said at least one portion of the slide shoes is slidable relative to the associated remainder of the slide shoe between an extended position when the slide shoe is positioned in the associated first guide channel part and a retracted position when the slide shoe is positioned at the lower second level.

12. The open roof construction according to claim 11, wherein each of said at least one portion of the slide shoes is preloaded towards the extended position.

13. The open roof construction according to claim 12, wherein each of the guide channels is provided with two opposite guide slots extending along the associated first and second guide channel parts of the guide channel and cooperating with two opposite slide shoe wings of which a first slide shoe wing defines said associated at least one portion of the slide shoe, wherein each of the guide slots cooperating with each associated said first slide shoe wing is shaped such in the associated second guide channel part that the second guide channel part causes the first slide shoe wing to move from the extended position towards the retracted position when the slide shoe enters said second guide channel part.

14. The open roof construction according to claim 9, wherein each of said at least one portion of the slide shoes is rotatable relative to the associated remainder of the slide shoe between a non-rotated position when the slide shoe is positioned in the associated first guide channel part and a rotated position when the slide shoe is positioned at the lower second level.

15. The open roof construction according to claim 14, wherein each of said at least one portion of the slide shoes is preloaded towards the non-rotated position.

16. The open roof construction according to claim 15, wherein each of the guide channels is provided with two opposite guide slots extending along the first and second guide channel parts of the guide channel and cooperating with two opposite slide shoe wings defining each of said associated at least one portion of the slide shoes, which in a commonly rotatable manner are connected to the associated remainder of the slide shoe, wherein the guide slots are shaped such in the second guide channel part that they cause the slide shoe wings to rotate from their non-rotated position towards their rotated position when the slide shoe enters said second guide channel part.

17. The open roof construction according to claim 15, wherein each of said at least one portion of the slide shoes is rotatable relative to the associated remainder of the slide shoe around an axis of rotation extending substantially in parallel to the associated first guide channel part.

18. The open roof construction according to claim 16, wherein each of said at least one portion of the slide shoes is rotatable relative to the associated remainder of the slide shoe around an axis of rotation extending substantially in parallel to the associated first guide channel part.

* * * * *